United States Patent [19]

Carl et al.

[11] 3,879,605

[45] Apr. 22, 1975

[54] SPECIAL PURPOSE HYBRID COMPUTER TO IMPLEMENT KRONECKER-MATRIX TRANSFORMATIONS

[75] Inventors: Joseph W. Carl, Teaneck, N.J.; Richard V. Swartwood, Fruitland, Idaho

[73] Assignee: The United States of America as represented by the Secretary of the Air Force, Washington, D.C.

[22] Filed: June 4, 1973

[21] Appl. No.: 366,915

[52] U.S. Cl. .............................................. 235/156

[51] Int. Cl. .............................................. G06f 15/34

[58] Field of Search .......... 235/156, 152; 324/77 B, 324/77 D; 179/15 BC

[56] References Cited

UNITED STATES PATENTS

| | | | |
|---|---|---|---|
| 3,581,078 | 5/1971 | Robertson | 235/193 |
| 3,641,330 | 2/1972 | Hatano et al. | 235/159 |
| 3,742,201 | 6/1973 | Groginsky | 235/156 |
| 3,754,128 | 8/1973 | Corinthois | 235/156 |
| 3,792,355 | 2/1974 | Miyatu et al. | 325/42 |

OTHER PUBLICATIONS

P. S. Monarir et al., "Amplitude Bounds & Quantization Schemes in Walsh-Forrier Domain," IEEE Trans. on Electro. Compat., Aug. 1971, pp. 142–150.

H. C. Andrews et al., "A Generalized Technique for Spectral Analysis," IEEE Trans. on Computers, Jan. 1970, pp. 16–25.

M. J. Corinthios, "The Design of a Class of FFT Computers" IEEE Trans. on Computers, June 1971, pp. 617–23.

M. J. Corinthios, "A FFT for High-Speed Signal Processing," IEEE Trans. on Computers, Aug. 1971, pp. 843–846.

*Primary Examiner*—Malcolm A. Morrison
*Assistant Examiner*—David H. Malzahn
*Attorney, Agent, or Firm*—William Stepanishen

[57] ABSTRACT

A Walsh transform computer to transform input data, such as, a stream of sampled signals, a digital signal, or the output of a photo-diode array, according to a Kronecker-matrix rule.

4 Claims, 11 Drawing Figures

SPECIAL PURPOSE HYBRID COMPUTER TO IMPLEMENT KRONECKER-MATRIX TRANSFORMATIONS

BACKGROUND OF THE INVENTION

The present invention relates broadly to the computation of any member of a class of linear transformations, such class being characterized by a Kronecker-product rule for the construction of the bases of the transformation, and such computation to be performed by a special purpose computer. In particular, the Walsh transform is a member of the cited class of transformations, and is used herein to typify such class of transformations, the computations involved in such transformations, and the physical realizability of such special purpose computers to perform such computations.

In the prior art, the discrete Walsh transform has found application in many areas, including signal processing, pattern recognition, and communication theory. Much of the interest in this transform results from the computational advantages it offers over the more conventional Fourier transform, and from the simplicity of hardware Walsh transform computers and hardware Walsh filters. Several authors have presented algorithms for the computation of the discrete Walsh transform and the flow diagram for each of these algorithms constitutes the block diagram for a hardware device, such as a computer. The previous designs of such computers have required either N(N−1) or $N\log_m N$ summing junctions, where N is the total number of input data samples to be transformed and m is the number of inputs to each summing junction. The present Walsh transform computer requires only N summing junctions and thus reduces the required number of summing junctions by a factor of $\log_m N$ over the most efficient previous design.

SUMMARY

The present invention utilizes a recursive algorithm for the discrete Walsh transform which leads to an efficient hardware implementation. The flow diagram of the algorithm constitutes a block diagram for a transform computer requiring only $N\log_2 N$ additions performed in N summing junctions where N is the number of input elements. When N=256 the recursive structure of the algorithm allows a hybrid implementation requiring only 256 summing junctions, rather than 2048, where each junction is used eight times through a feedback loop. The reduction in the number of summing junctions may require additional sample and hold circuits at the input and output of each channel, and the necessary feedback control logic and the time required for feedback. However, this results in a reduction in the size and complexity of the transform computer. In the realization described below, the extensive use of sample and hold circuits in a hybrid (analog and digital) device provides the result that, when N=256, only 700 microseconds are required to compute a transform. This is over 100 times faster than software for the PDP-12 computer (with which the transform computer will be interfaced) and the PDP-12 will be freed for other operations, such as processing previously stored data.

It is one object of the invention, therefore, to provide an improved Walsh transform computer utilizing a recursive algorithm to perform the Walsh transform function which results in a reduction in hardware implementation.

It is another object of the invention to provide an improved Walsh transform computer utilizing only N summing junctions where N is the total number of input data samples.

It is yet another object of the invention to provide an improved Walsh transform computer wherein a feedback-in-time circuit is utilized to implement the Kronecker-product rule.

These and other advantages, features and objects of the invention will become more apparent from the following description taken in connection with the illustrative embodiment in the accompanying drawings.

DESCRIPTION OF THE PREFERRED EMBODIMENT

The discrete Walsh transform has found application in many areas, including signal processing, pattern recognition, and communication theory. Much of the interest in this transform results from the computational advantages it offers over the more conventional Fourier transform, and from the simplicity of hardware Walsh transform computers and hardware Walsh filters. In the prior art, several algorithms for the computation of the discrete Walsh transform have been presented, and the flow diagram for each of these algorithms constitutes the block diagram for a hardware device. A matrix factorization technique has been developed which leads to a fast, efficient algorithm. This technique may be used to factor matrices formed by the Kronecker product rule with the result that matrices of order $N = n^p$ can be factored into p matrices of order N. If the matrix to be factored is generated by the Kronecker product of identical matrices, then its factors will also be identical. The result of this technique is shown below for a Walsh matrix (in natural order) of order $N = 8 = 2^3$.

$$W_8 = \begin{bmatrix} 1 & 1 \\ 1 & -1 \end{bmatrix} \times \begin{bmatrix} 1 & 1 \\ 1 & -1 \end{bmatrix} \times \begin{bmatrix} 1 & 1 \\ 1 & -1 \end{bmatrix}$$

$$= \begin{bmatrix} 1 & 1 & 1 & 1 \\ 1 & -1 & 1 & -1 \\ 1 & 1 & -1 & -1 \\ 1 & -1 & -1 & +1 \end{bmatrix} \times \begin{bmatrix} 1 & 1 \\ 1 & -1 \end{bmatrix}$$

$$
\begin{bmatrix}
1 & 1 & 1 & 1 & 1 & 1 & 1 & 1 \\
1 & -1 & 1 & -1 & 1 & -1 & 1 & -1 \\
1 & 1 & -1 & -1 & 1 & 1 & -1 & -1 \\
1 & -1 & -1 & 1 & +1 & -1 & -1 & 1 \\
1 & 1 & 1 & 1 & -1 & -1 & -1 & -1 \\
1 & -1 & 1 & -1 & -1 & 1 & -1 & 1 \\
1 & 1 & -1 & -1 & -1 & -1 & 1 & 1 \\
1 & -1 & -1 & 1 & -1 & 1 & 1 & -1
\end{bmatrix}
$$

Figure 2:
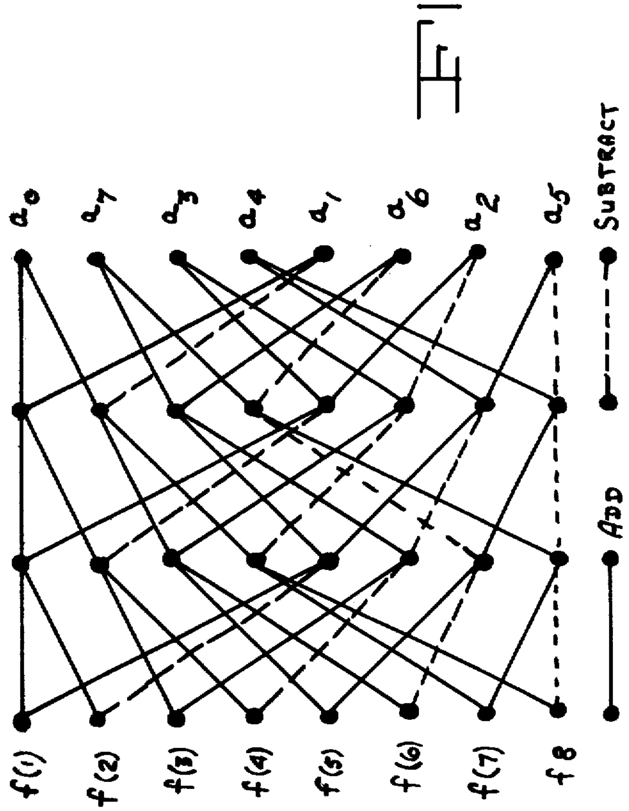
FIG. 2 is a flow diagram of the fast transform algorithm [Alg (1)] for N=8.

Then the factorization technique results in $$
W_8 = \begin{bmatrix}
1 & 1 & 0 & 0 & 0 & 0 & 0 & 0 \\
0 & 0 & 1 & 1 & 0 & 0 & 0 & 0 \\
0 & 0 & 0 & 0 & 1 & 1 & 0 & 0 \\
0 & 0 & 0 & 0 & 0 & 0 & 1 & 1 \\
1 & -1 & 0 & 0 & 0 & 0 & 0 & 0 \\
0 & 0 & 1 & -1 & 0 & 0 & 0 & 0 \\
0 & 0 & 0 & 0 & 1 & -1 & 0 & 0 \\
0 & 0 & 0 & 0 & 0 & 0 & 1 & -1
\end{bmatrix}
$$

wherein the relationship between the Kronecker-product rule and the factors is apparent. The matrix which is raised to power P (3 for the case shown) is called the core matrix. The advantage of this particular factorization method is that the matrix factors include many zeros, thereby reducing the number of computations required. Thus, by using this technique, the number of computations required to compute the Walsh transform is reduced to N $\log_2$N. The factorization which is demonstrated above forms the basis for the algorithm ALG(1) which has the flow diagram that is shown in FIG. 2. It may be noted that the structure of the algorithm is recursive, and the interconnection of successive layers is identical. The recursive structure for this algorithm may be formalized in the following way. Let $f(n)$ be a real function of the positive integers less than or equal to $N = 2^p$, where $p$ is a positive integer. The Walsh transform (in natural order) of $f(n)$ may be obtained by $$y_0(n) = f(n) \qquad (1)$$

$$y_{i+1}(n) = \begin{cases} y_i(2n-1) + y_i(2n), & 0<n \leq N/2 \\ y_i(2n-N-1) - y_i(2n-N), & N/2<n \leq N \end{cases} \qquad (2)$$

$$a(n) = y_p(n) \qquad (3)$$

The above results may be expanded to two-dimensional Walsh transforms, but it is simpler to note that two-dimensional transforms are simply one-dimensional transforms with the inputs and outputs appropriately relabeled.

The present invention is utilized in a pattern recognition system which includes an opaque flying-spot scanner for discretizing two-dimentional patterns and converting them into analog video signals. The scanner is under the control of a Digital Equipment Corporation PDP-12 digital computer which provides synchronization and scan control signals to the scanner, and analog-to-digital (A-D) conversion of the video from the scanner. The PDP-12 is also used to accept the Walsh transform coefficients from the present invention and to make the identification decision on the basis of such coefficients. A block diagram of the present invention for the case N=8 is shown in FIG. 1.

An analog implementation is utilized due to the speed and efficiency of analog circuitry to do parallel and serial additions or subtractions such as those required to implement ALG(1). In addition, the gains of operational amplifiers and their interconnections are easily changed, thus providing the possibility of computing other transforms with only minor changes. An analog implementation of ALG(1) for N = 16 × 16 = 256 would require N—$\log_2$N = 2048 operational amplifiers if the interconnections were of the form shown in FIG. 2. The recursive structure of ALG(1), however, allows a realization that requires only N = 256 summing junctions that are each used $\log_2$N = 8 times through a feedback loop.

Figure 1:
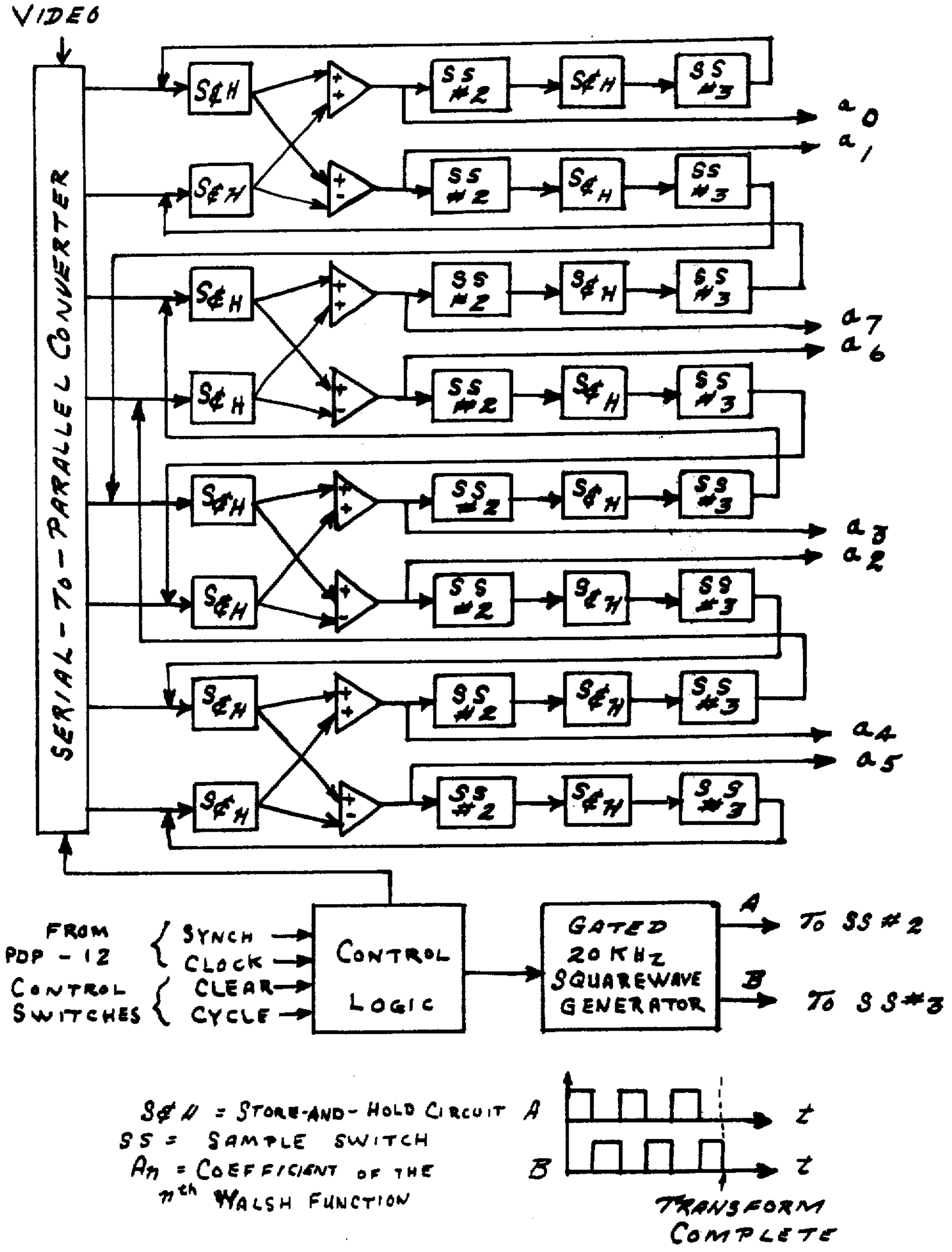
FIG. 1 is a block diagram of the Walsh transform computer in accordance with the present invention.

There is shown in FIG. 1 a hybrid implementation of transform computer for N = 8 which implements ALG(1), although in a slightly modified form. This modification consists of expressing the core matrix (for N = 8) as $$
\begin{bmatrix}
1 & 1 & 0 & 0 & 0 & 0 & 0 & 0 \\
0 & 0 & 1 & 1 & 0 & 0 & 0 & 0 \\
0 & 0 & 0 & 0 & 1 & 1 & 0 & 0 \\
0 & 0 & 0 & 0 & 0 & 0 & 1 & 1 \\
1 & -1 & 0 & 0 & 0 & 0 & 0 & 0 \\
0 & 0 & 1 & -1 & 0 & 0 & 0 & 0 \\
0 & 0 & 0 & 0 & 1 & -1 & 0 & 0 \\
0 & 0 & 0 & 0 & 0 & 0 & 1 & -1
\end{bmatrix}
=
\begin{bmatrix}
1 & 0 & 0 & 0 & 0 & 0 & 0 & 0 \\
0 & 0 & 1 & 0 & 0 & 0 & 0 & 0 \\
0 & 0 & 0 & 0 & 1 & 0 & 0 & 0 \\
0 & 0 & 0 & 0 & 0 & 0 & 1 & 0 \\
0 & 1 & 0 & 0 & 0 & 0 & 0 & 0 \\
0 & 0 & 0 & 1 & 0 & 0 & 0 & 0 \\
0 & 0 & 0 & 0 & 0 & 1 & 0 & 0 \\
0 & 0 & 0 & 0 & 0 & 0 & 0 & 1
\end{bmatrix}
\begin{bmatrix}
1 & 1 & 0 & 0 & 0 & 0 & 0 & 0 \\
1 & -1 & 0 & 0 & 0 & 0 & 0 & 0 \\
0 & 0 & 1 & 1 & 0 & 0 & 0 & 0 \\
0 & 0 & 1 & -1 & 0 & 0 & 0 & 0 \\
0 & 0 & 0 & 0 & 1 & 1 & 0 & 0 \\
0 & 0 & 0 & 0 & 1 & -1 & 0 & 0 \\
0 & 0 & 0 & 0 & 0 & 0 & 1 & 1 \\
0 & 0 & 0 & 0 & 0 & 0 & 1 & -1
\end{bmatrix}
$$

This slight modification allows the grouping of channels into pairs on the circuit boards, and results in reducing by one-half the number of signal interconnections required between boards.

The flying-spot scanner can be operated at sampling rates in excess of ten kilohertz, and has no restriction on how slow it may be operated. The output video should be sampled within 1 millisecond of the input clock pulse, however, due to droop in the scanner sample-and-hold circuit. Since the scanner is seldom operated at rates lower than 1 kilohertz, a range of operation of 1 to 20 kilohertz was considered sufficient for the transform computer.

The 20 kilohertz rate imposes a minimum sampling time of 50 microseconds on all of the input sample-and-hold circuits. The 1 kilohertz rate imposes a maximum holding time of 255 milliseconds on all of the input sample-and-hold circuit of the first channel, with each succeeding channel requiring successively 1 millisecond less. In order that all circuit boards would be interchangeable, they were made identical with all input sample-and-hold circuits having a 255 millisecond holding capability. The second sample-and-hold circuits have a 50 microsecond sampling time. With the transform computer operating at its maximum possible rate of 20 kilohertz (limited by the 50 microsecond sampling time of the sample-and-hold circuits), the second sample-and-hold circuit is only required to hold for 50 microseconds. This short holding time allowed considerable simplification in the second sample-and-hold ciricuit.

The 16 × 16 transform requires eight passes through the amplifiers, or seven feedback cycles. Since only 100 microseconds are required to cycle the sample-and-hold circuits to return the output signals to the inputs, the transform can be completed in 700 microseconds after the input data has been sampled.

With the algorithm selected, and the circuitry specified to implement it, the only other major design consideration is for the serial-to-parallel conversion of the video data from the flying-spot scanner. Sample-and-hold circuits are already required at the input to the transform computer, so if an input sampling switch is added to each channel, then all that is needed is some method to sequentially gate the input switches.

The method selected was to use a 256-bit shift register, with the output of each flip-flop in the register used to gate an input sampling switch. If a "1" is entered into the register and shifted through it, then the switches will be gated sequentially.

Figure 3:
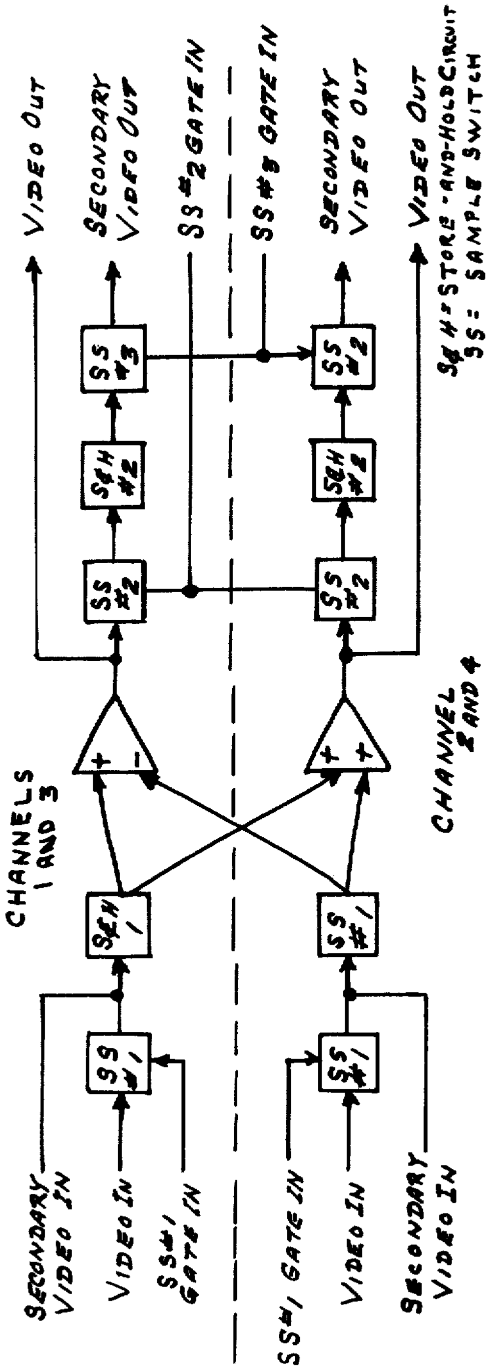
FIG. 3 is a block diagram of the four channel sample and hold amplifier.

The heart of the transform computer is the four channel sample-and-hold amplifier. Each amplifier board consists of two identical pairs of channels, each pair having the configuration shown in the block diagram in FIG. 3. Each channel in a pair is identical except for the summing circuits. The channel one summing circuit subtracts the input signal to channel two from the input signal to channel one, while the channel two summing circuit adds the two input signals together, and similarly for the summing circuits in channels three and four.

Figure 4:
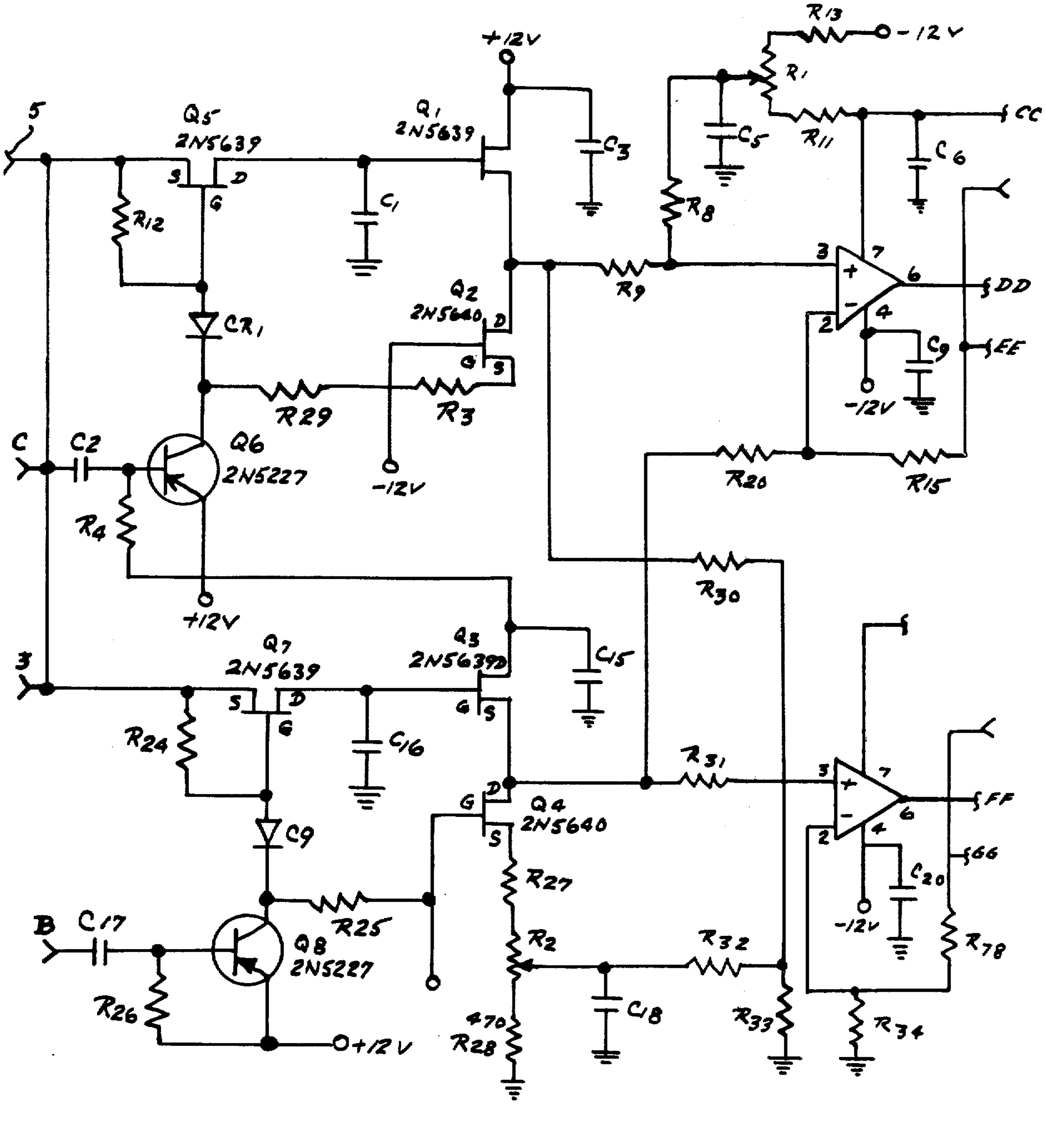
FIGS. 4 and 4*a* in combination are a schematic diagram of the four channel sample and hold amplifier, wherein like characters on continguous figures are interconnected, FIG. 5 and 5*a* in combination are a schematic diagram of the shift register.
Figure 4A:
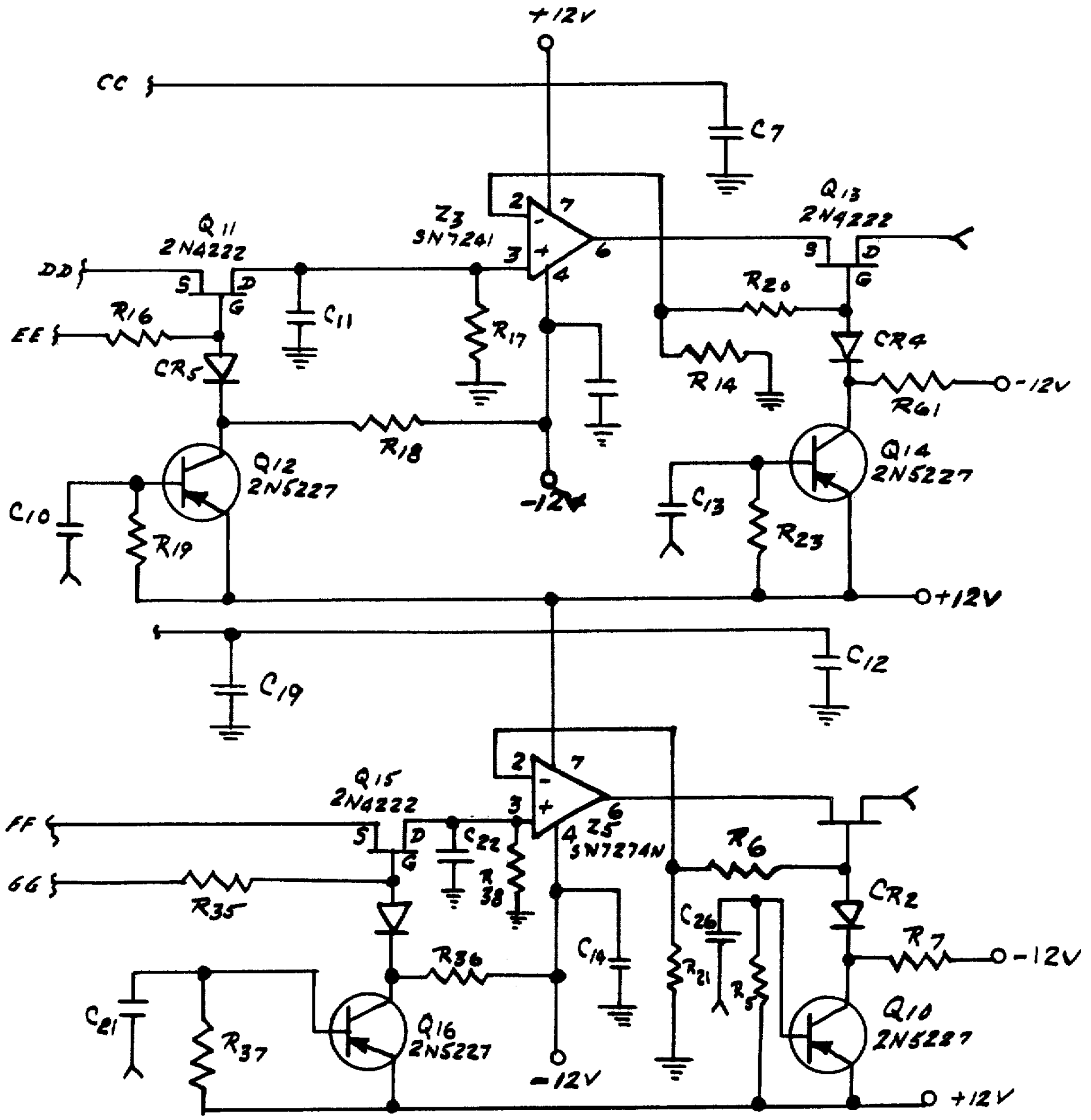

The schematic of a sample-and-hold amplifier is shown in FIGS. 4 and 4*a*. Only one-half of the amplifier is shown in FIGS. 4 and 4*a* since both halves are identical. The following discussion of the operation of the circuit will be primarily for channel one, but applies to the other channels equally.

The circuit was designed for the video to be present at the input (pin 5) continuously, thus the gate pulse to the input or first sampling switch must be synchronized with the video, so that the video is sampled at the proper time. A negative pulse supplied to the base of Q6 will turn Q6 on, resulting in a rise in the collector voltage from −12 volts to +12 volts. This reverse biases diode CR1 so that the gate voltage of Q1 can rise to the level of the source voltage. This turns Q5 on allowing C1 to charge to the level of the video input signal. The video input signal is limited to less than ±12 volts so that CR1 cannot be reverse biased while Q6 is off, or cannot be forward biased while Q6 is on. Q1 is a high input impedence field effect transistor (FET) follower used to isolate C1 from the relatively low input impedance of the summing circuits. Q2 is a constant current source to assure the linearity of Q1. The input sample-and-hold circuit is quite effective with less than 5 percent droop in 255 milliseconds, the maximum holding time required of the circuit. The output of Q1 has a fixed offset voltage of 1 to 3 volts depending upon the particular characteristics of the transistors used for Q1 and Q2, and similarly with the output from Q3 in channel two. Since the output of Q3 is subtracted from the output of Q1 in channel one, the offset voltages tend to cancel, but a large offset voltage may still exist. This offset voltage can be nulled by the voltage divider R1, R11, and R13. In channel two, the signals from Q1 and Q3 are summed together, so that a large offset voltage occurs. This offset voltage can be nulled by the voltage divider R2 and R28.

Sampling switches two and three operate the same as the input sampling switch. The second sample-and-hold circuit is somewhat different from the input sample-and-hold circuit in that an operational amplifier (Z3) is used instead of a FET follower. This sample-and-hold is only required to hold for 50 microseconds and does not require the high input impedence of a FET follower. This resulted in a considerable savings since the operational amplifier used costs less than one-third as much as the two FETS used for Q1 and Q2. The output of the third sampling switch is the secondary video to be fed back to the proper input sample-and-hold circuit as required by the algorithm. After data has been sampled and stored in the input sample-and-hold, the second and third sampling switches are gated on alternately for 50 microseconds each. After seven cycles (700 microseconds) the output of Z1 is a Walsh coefficient, and is available at a connector on the front panel. The ordering of the coefficients will be apparent to practicers of the art.

The video from the flying-spot scanner can vary from 0 to 2 volts, being proportional to the brightness of the input pattern. This means that any of the Walsh coefficients (except $a_0$, which may vary from 0 to +512 volts) may vary from −256 to +256 volts, which is beyond the capabilities of the circuitry. To keep the voltages within operational limits, the summing circuits were designed to have a gain of one-half. In this way, the output of the transform computer will never exceed the highest input, and input signals of up to approximately ± 10 volts can be accepted.

The four video inputs on each board are permanently connected together, and the video inputs to each board are wired to a common video bus. The gate inputs to the second sampling switches have been bussed together in groups of eight boards, as have the gate inputs to the third sampling switches.

Figure 5:
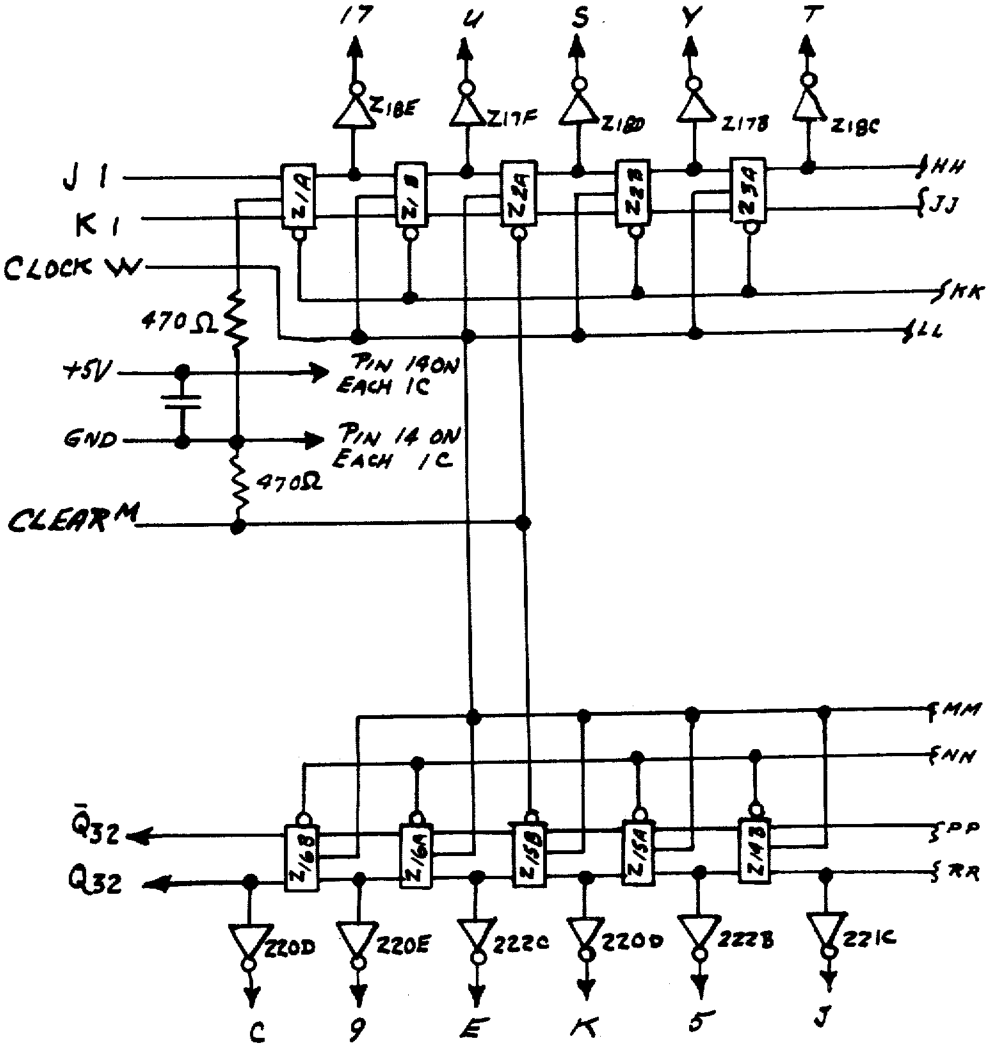
Figure 5A:
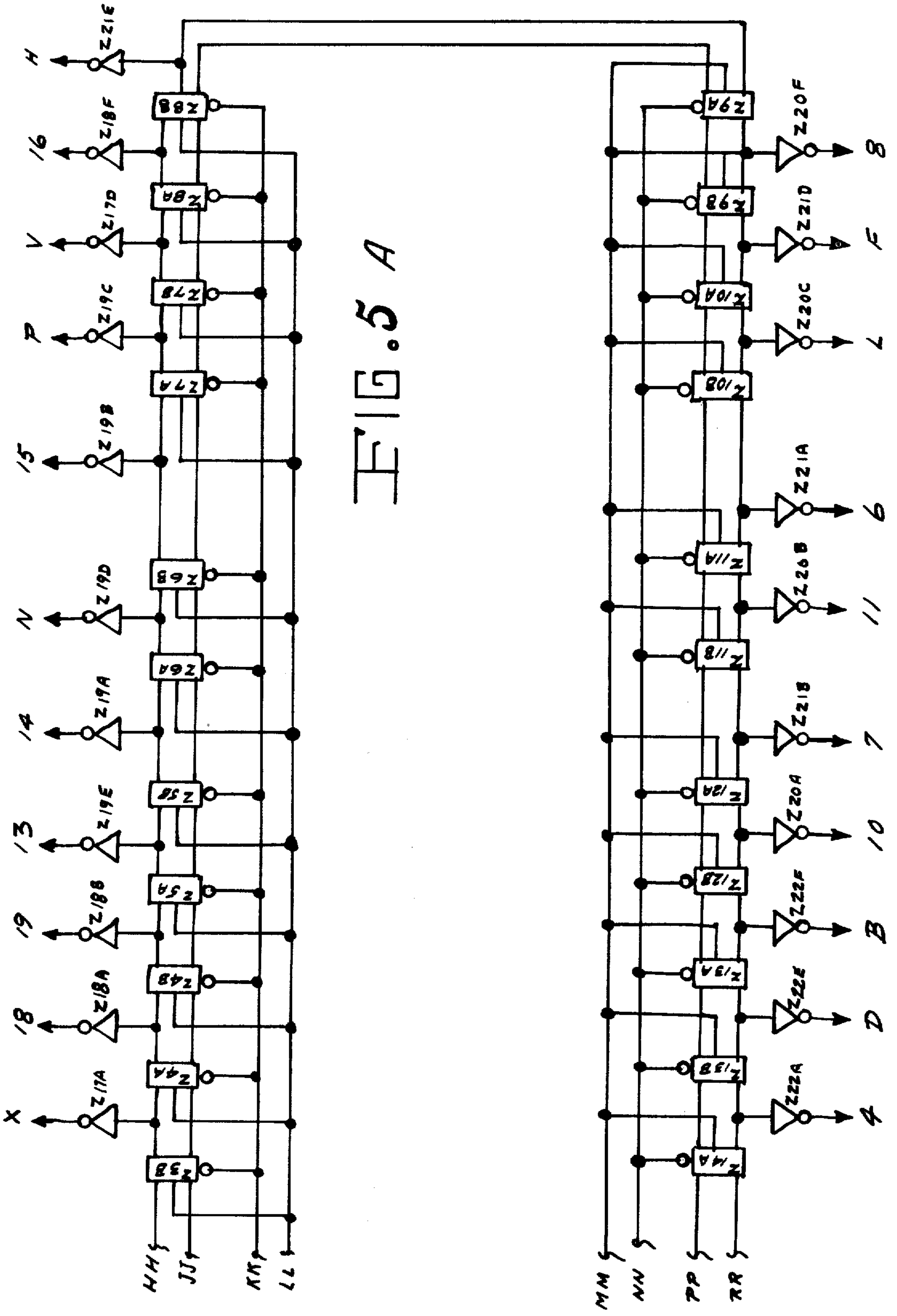

The next most important part of the transform computer is the 256-bit shift register which controls the serial-to-parallel conversion of the input data. The shift register is composed of eight 32-bit shift registers connected serially. One 32-bit shift register is composed of 32 J-K flip-flops on a single printed circuit board as shown in the schematic of FIG. 5.

The clock and clear inputs to each shift register require drivers capable of handling the 102.4 milliampere load of each of these inputs. Open collector inverters (located on board B) are used for the drivers, but require external collector resistors for proper operation. Due to space limitations on board B, these resistors were placed on the shift register boards, and are the two 470-ohm resistors shown in the schematic of the shift register.

The Q output of each flip-flop is buffered by an inverter, so that the effective output is $\bar{Q}$. The negative pulses from these outputs when a "1" is shifted through the register are the required gate pulses for the input sampling switches of the sample-and-hold amplifiers. With each output of the shift register connected to the gate input of an input sampling switch, the switches will be gated sequentially. If the clock pulses that drive the shift register are synchronous with the video, then each channel will sample the video at the proper time.

Figure 6:
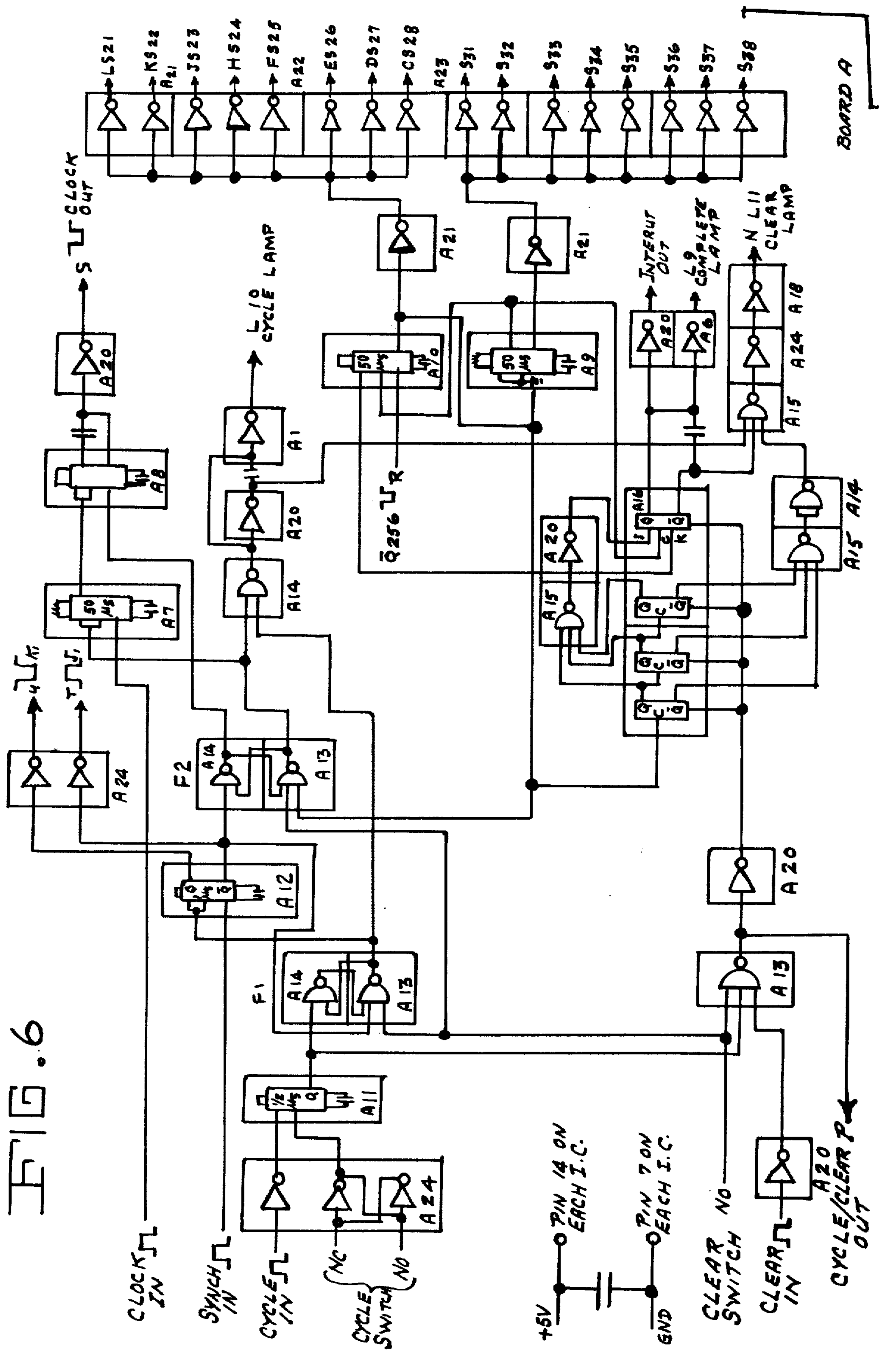
FIG. 6 is a schematic diagram of the control logic on board A, FIGS. 7 and 7*a* in combination are a schematic diagram of the control logic on Board B.
Figure 7:
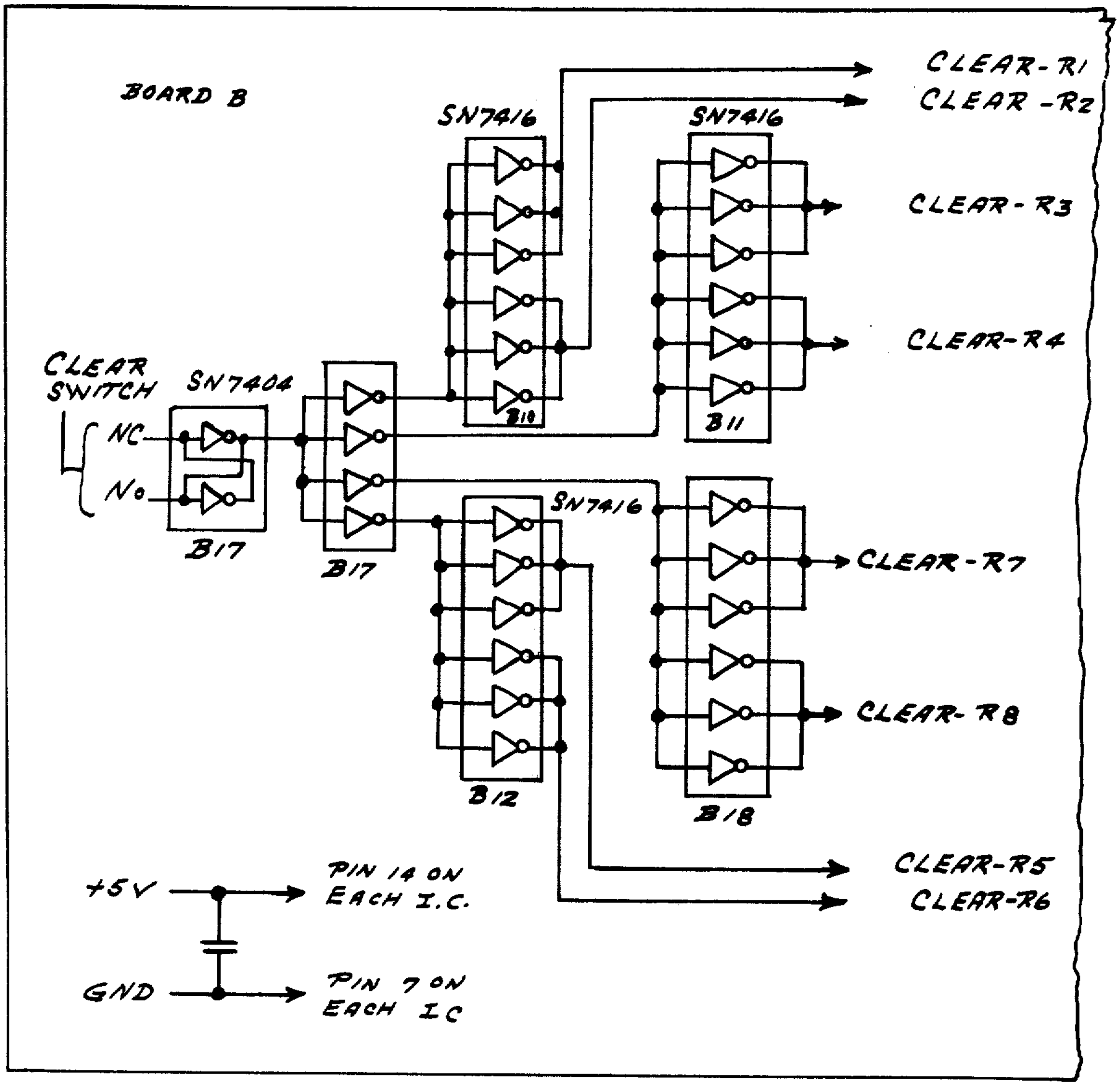
Figure 7A:
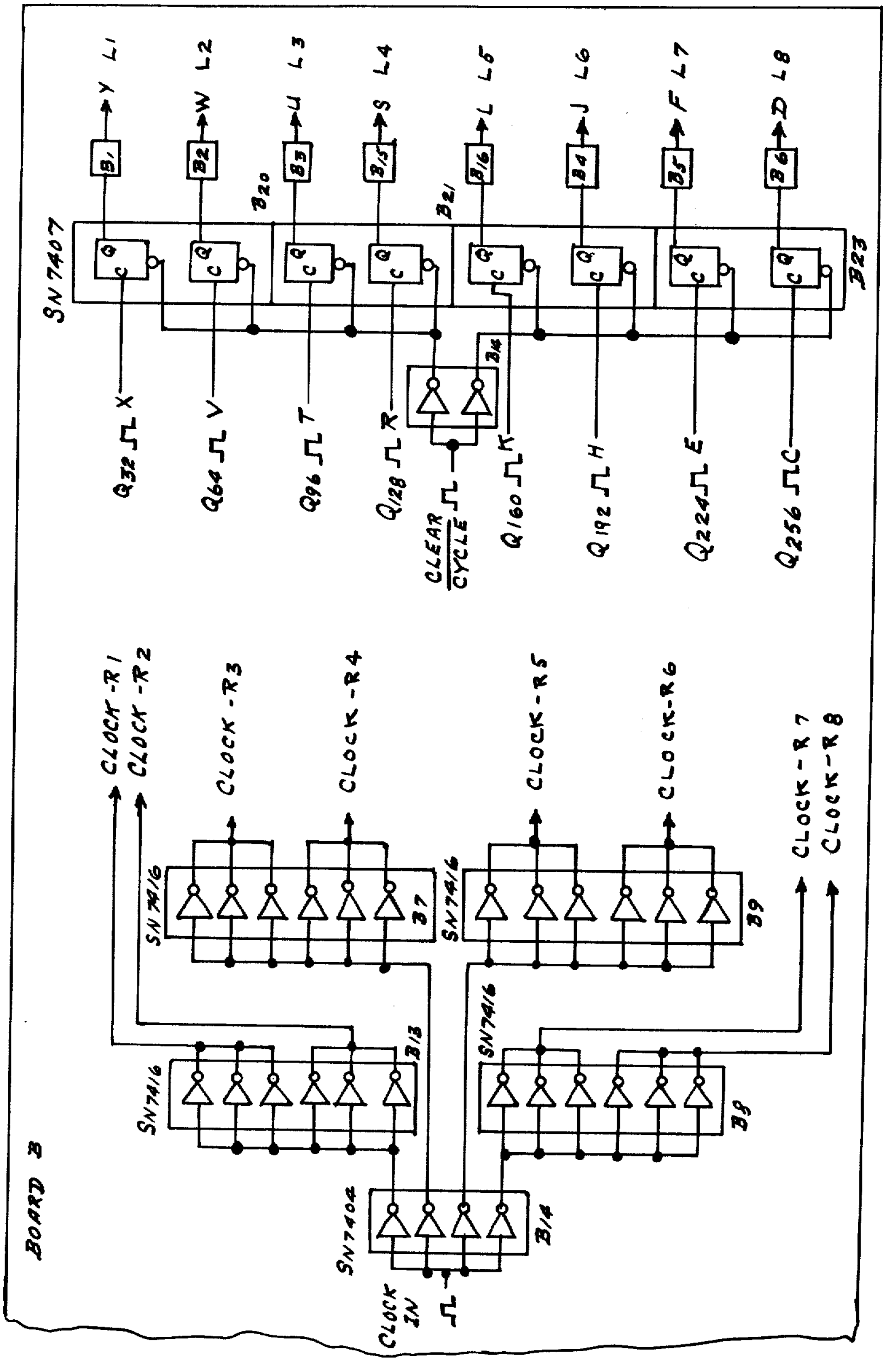

The functions of the sample-and-hold amplifiers and the shift register are under the control of the control logic located on boards A and B. The schematic of these boards are shown in FIGS. 6, 7, and *7a*. Board A contains all of the control logic, while board B contains the drivers for the clock and clear inputs of the shift register, the shift indicator flip-flops, and the lamp drivers for the shift indicator lamps.

Prior to describing the control logic, boards A and B, the function of the synch and clock pulses with respect to the video from the flying-spot scanner will be described. These pulses are generated in the PDP-12 computer by special instructions. Executing the instruction 6321 generates one synch pulse, while executing the instruction 6322 generates one clock pulse. These pulses are fed to the flying-spot scanner and the transform computer. A clock pulse gates the beam of the flying-spot scanner on, and a point of the input pattern is sampled for four microseconds. At the end of the sampling period, the position of the beam is incremented, while a sample-and-hold circuit holds the sampled value until the next clock pulse, when another sample is taken. During the sampling period, an automatic light control circuit drives the output signal from the sample-and-hold to zero. The scanner operates like an ordinary television in that it scans from left to right and from top to bottom. If the beam is at the last point of a line, it will increment to the first point of the next line, or if it is at the last point of the last line, it will increment to the first point of the first line. If at any time a synch pulse is generated, the scanner automatically positions the beam to the first point of the first line. Therefore, a synch pulse should always be generated prior to sampling an input pattern, so that sampling always starts at the top-left corner. With the above in mind, the control logic will now be discussed.

The clear and cycle switches on the front panel of the transform computer are wired as single-pole double-throw push-button switches. The center pole of each switch is grounded, and each contact terminal is connected to the input of an inverter in the control logic. These inverters are interconnected as bounce eliminators. The clear switch clears all flip-flops in the control logic, and also clears the shift register. A pulse in the clear input will only clear the J-K flip-flops in the control logic, and not the synch enable flip-flop (F1) or the clock enable flip-flop (F2). Both the cycle switch and the cycle input will trigger A-11 (A-eleven) for ½ microsecond, which, in turn clears all the J-K flip-flops in the control logic and also sets F1. F1 then enables the input to A12, so that the next synch pulse will trigger A12. When A12 is triggered, it inverts the J1 and K1 inputs to the shift register for 1 microsecond, clears F1, and sets F2. F2 in turn enables the input to A7 and triggers A8. A8 generates a one-half microsecond clock pulse which goes through the clock drivers on board B and then to the shift register, and a "1" is entered into the first bit of the shift register. Additional synch pulses will not be accepted by the control logic since F1 has been cleared, disabling the input to A12. However, F2 remains set, so that clock pulses can trigger A7. When A7 is triggered, it generates a 50 microsecond pulse, the trailing edge of which triggers A8 and generates a ½ microsecond clock pulse. In effect, a clock pulse from the PDP-12 is delayed 50 microseconds before being sent to the shift register. This seemingly complicated method of entering a "1" into the shift register, and clocking the register is necessitated by the fact that the scanner starts sampling at the leading edge of the clock pulse from the PDP-12. This scheme makes sure that the video blanking occurs at the beginning of a sampling period rather than at the end of it, and therefore will not have any effect on the sampled data.

When the "1" is shifted out of the shift register, that is, when the last flip-flop resets, it triggers A10. A10 and A9 are interconnected as a 10 kilohertz multivibrator, and are used to generate the 50 microsecond gate pulses for sampling switches two and three in the sample-and-hold amplifiers. When A10 is first triggered, it clears F2 so that additional clock pulses will not be accepted by the control logic. Also each time A10 triggers, it increments the three-bit counter composed of F3, F4 and F5. On the seventh pulse, the input to A10 is disabled, and the J and K inputs to F6 are inverted. At the end of the next pulse from A9, F6 is set, sending out an interrupt signal and turning on the complete lamp.

Whenever F1 through F6 are clear, the clear lamp is turned on, and whenever F1 or F2 is set, the cycle lamp is turned on. The eight J-K flip-flops on board B are connected to every 32nd flip-flop of the shift register, and when a "1" is shifted through the shift register, the flip-flops on board B set, and turn on the shift indicator lamps.

The video input amplifier and −1 volt reference supply, board C, in an add-on to the transform computer, and is necessitated by the limited range of operation of the A-D converter in the PDF-12 used in the pattern recognition system. The output of the A-D converter varies over a range of $-777_8$ to $+777_8$ with a differential input voltage range of 0 to +2 volts, and with a +1 volt input giving a zero output. This is compatible with the 0 to +2 volt range of the video signal from the flying-spot scanner. However, an 0 to +2 volt range at the input of the transform computer results in a −1 to +1 volt range of the outputs, except the coefficient of the first Walsh function, which has an 0 to +2 volt range. By offsetting the input video by −1 volt, the range of all the outputs becomes −1 to + 1 volts.

Figure 8:
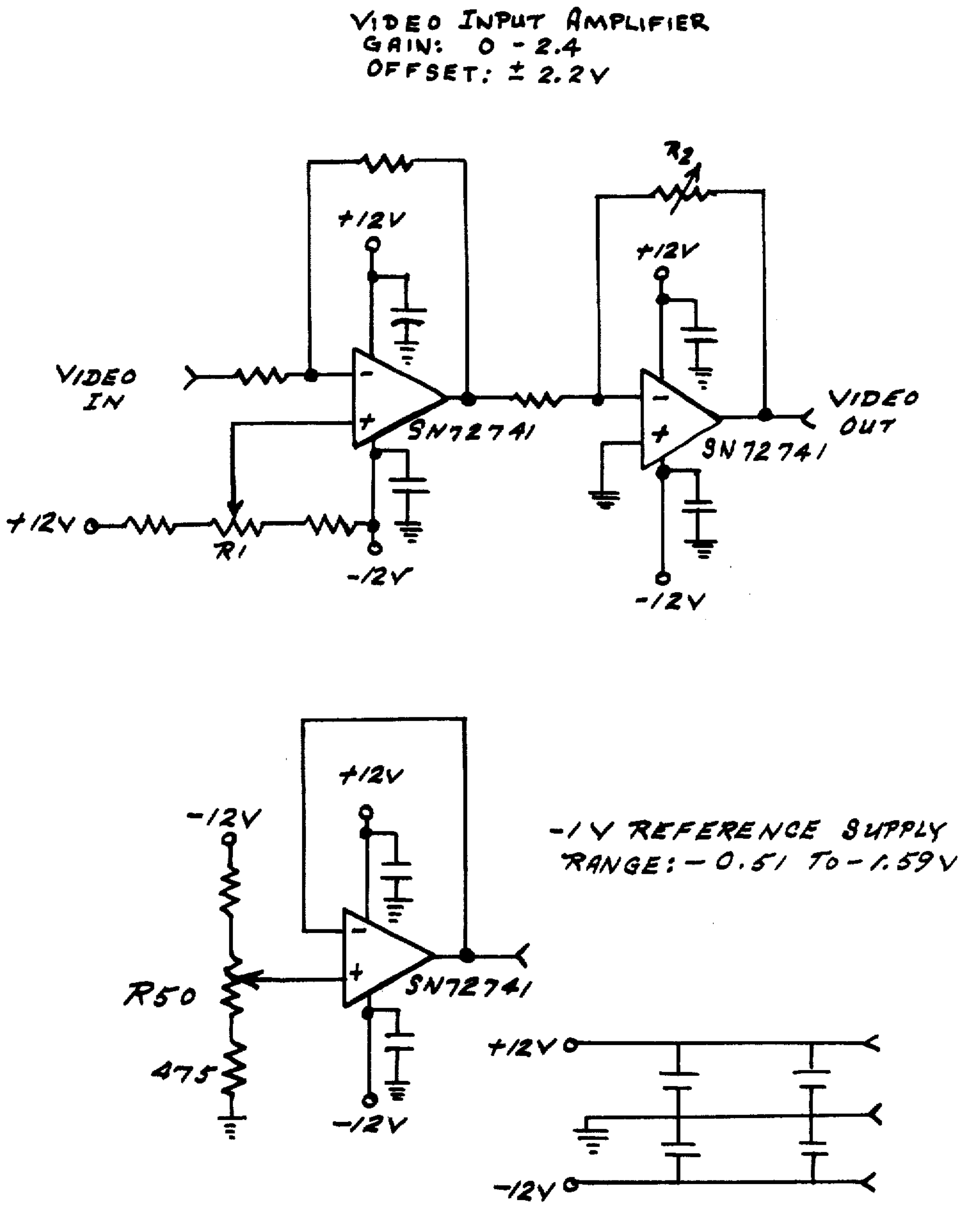
FIG. 8 is a schematic diagram of the video input amplifier and minus one volt reference supply.

The −1 volt offset is achieved in the video input amplifier. The schematic of the amplifier is shown in FIG. 8. The amplifier is comprised of two operational amplifiers. The first operational amplifier is used as a unity gain amplifier with a −2.2 to +2.2 volt offset capability. The output of this amplifier goes to the second operational amplifier, which is used as variable gain amplifier with its gain variable from 0 to 2. Using two operational amplifiers in this configuration, the input impedance is essentially constant at ten kilohms and the gain and offset of the amplifier operate independently on the input video signal. The gain is normally set to one, and the offset to −1 volt when the video input signal is from the flying-spot scanner.

The schematic of the −1 volt reference supply is also shown in FIG. 8 and is comprised of an operational amplifier used as a unity gain amplifier with a voltage divider as its input. The output of the reference supply is variable from approximately −0.5 to −1.5 volts, and is normally adjusted to −1.0 volts. This supply is used to provide a −1 volt reference to the inverting input of the A-D converter, with the result that the output of the transform computer effectively varies from 0 to +2 volts, the range of operation of the A-D converter.

Although the invention has been described with reference to a particular embodiment, it will be understood to those skilled in the art that the invention is capable of a variety of alternative embodiments within the spirit and scope of the appended claims.

We claim:

1. A special purpose computer for the computation of a class of linear Walsh transformations, such class being characterized by a Kronecker-product rule for the construction of the bases of the transformation, and such class being typified by the Walsh transform, comprising:

a. means for accepting input data, b. means for computing having a core matrix, said computing means computing the product of said core matrix and the input data, said computing means being arranged to compute the algorithm ALG(1), said computing means operably connected to said accepting means, said core matrix resulting from the factorization of the Walsh matrix according to the Kronecker-product rule, said Kronecker-product rule and said factorization being defined by the flow diagram for said algorithm ALG(1), c. a control logic unit to control the recursive transfer of the output of said means for computing the product of the core matrix and the input data to the input of said computing means, said control logic unit operably connected to said computing means, said recursive transfer to take place the appropriate number of times, said appropriate number being a predetermined number, said predetermined number being defined by the flow diagram appertaining for the algorithm ALG(1), and said recursive transfer to result in the iterative computation of the desired transformation, and d. readout means for transferring the output of said computing means to external equipment, said readout means operably connected to said computing means.

2. A special purpose computer as described in claim 1 wherein said predetermined number equals 8.

3. A special purpose computer for the computation of the Walsh transform of a serial sequence of input data, such sequence to be of length N where N is a power of two; comprising in combination:

a. serial to parallel converter unit to receive the sequence of input data, b. means for computing having a core matrix, said computing means computing the Walsh transform according to the recursive iterative multiplication of the input data by said core matrix, said core matrix resulting from the factorization of the matrix produced according to the Kronecker-product rule, said Kronecker-product rule and said factorization being embodied in the flow diagram for the algorithm ALG(1), c. a control logic unit operably connected to provide signals to said serial to parallel converter and to said means for computing the Walsh transform, said control logic unit controlling the transfer of interim results in said repetitive iterative multiplication and the transfer of data in and out of said computer means, and d. readout means for transferring the output of said computing means to external equipment, said readout means operably connected to said computing means.

4. A special purpose computer as described in claim 3 wherein said input and output data is multidimensional.

* * * * *